July 7, 1925.
N. B. HURD
LOCK
Filed Sept. 5, 1924
1,545,430
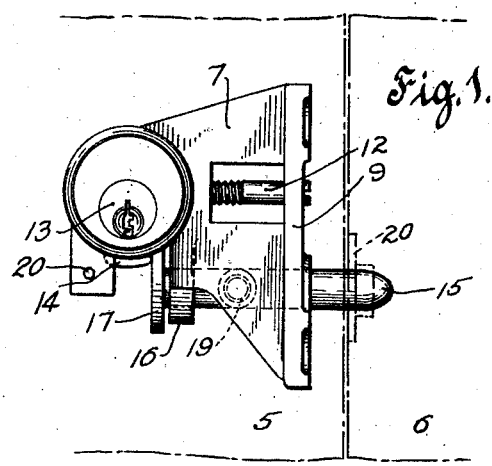
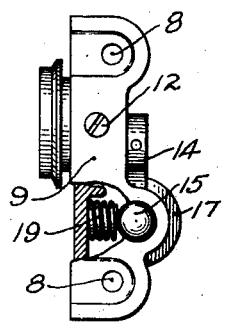
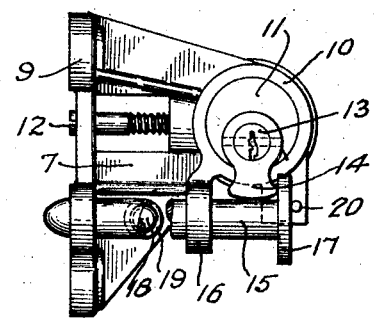
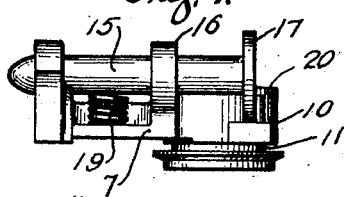
INVENTOR
Norman B. Hurd
BY
Mitchell Brothers
ATTORNEY Patented July 7, 1925.

1,545,430

UNITED STATES PATENT OFFICE.

NORMAN B. HURD, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

LOCK.

Application filed September 5, 1924. Serial No. 736,036.

*To all whom it may concern:*

Be it known that I, NORMAN B. HURD, a citizen of the United States of America, residing at New Britain, Connecticut, have invented a new and useful Lock, of which the following is a specification.

My invention relates to a lock, particularly, though not exclusively, adapted for use on automobile doors and the like.

It is an object of the invention to provide an effective lock which will be of simple construction and cheap to manufacture.

It is another object of the invention to provide a lock with means for causing a friction drag to be exerted on the locking bolt to resist its movement.

One form of the invention will be described in connection with the accompanying illustrative drawings, in which—

Fig. 1 is an outside view of the lock showing diagrammatically its application to an automobile door;

Fig. 2 is a front edge view, in partial section, of the lock shown in Fig. 1;

Fig. 3 is a rear side view of the lock with parts broken away, and

Fig. 4 is a bottom edge view of the lock.

In said illustrative drawings, 5 indicates diagrammatically a fragment of an automobile door or the like, while 6 similarly indicates the body or jamb of the door. The lock is applied to one or the other of the members just mentioned and, in the form shown, is secured to the door 5.

The preferred form of lock includes a lock casing or frame 7, which may be secured to the door, as by means of screws passing through apertures 8—8 in the front upstanding flange 9 of the lock frame. The frame illustrated is relatively thin and is of generally triangular shape and rear portion thereof is provided with a boss or an enlargement 10, having a cylindrical bore therein to receive a lock cylinder 11 of any suitable type. This cylinder may be held in place in the boss 10 by means of a screw 12, accessible from the front of the flange 9. This screw simply passes through the wall of enlargement and engages the cylinder for holding the same in place. A plug 13 fits in a suitable bore in the cylinder, as is usual in a cylinder lock and pin tumblers serve to hold the plug in either the locked or the unlocked position, as will be readily understood by those skilled in the art. On the rear end of the plug 13 is a rollback 14, which moves with the plug.

The front flange 9 has an aperture therein, through which the locking bolt 15 may pass. An ear or lug 16 is provided on the frame in rear of the front flange 9 and is similarly apertured for the passage of the locking bolt. It will be seen that the locking bolt is thus guided and supported so as to be slidable to the "out" or locked position, and to the "in" or unlocked position. In the form shown the locking bolt is a cylindrical rod having an abutment flange or head 17 on the rear end thereof, which head is adapted to be engaged by the roll back 14, so as to move the locking bolt to either the locked or the unlocked position.

In order to hold the locking bolt in position so as to avoid a too free movement, I may provide means for acting as a friction drag on the bolt. In the form shown the frame 7 has a small upstanding lug 18 directly beneath the locking bolt 15. A coil spring 19 is held in place on the lug 18, and frictionally engages the locking bolt so as to act as a friction drag and prevent a too free movement thereof.

In this type of lock it will be obvious that when the key is inserted in the plug so as to release the tumblers, the key may be turned so as to cause the roll back 14 to move the locking bolt outwardly into the keeper 20 to the locked position, and during this movement the friction spring 19 bearing on the bolt affords a little resistance, so as to prevent a too free movement of the locking bolt. When the bolt is in the locked position and the key withdrawn, the tumblers hold the plug against rotation and the rollback 14, engaging behind the flange 17, as shown in Fig. 1, will securely hold the bolt in the locked position. When the key is again inserted in the key slot the plug may be turned and the rollback, after being rotated, engages the opposite side of the head 17 and serves to retract the locking bolt, the friction spring 19, in this case also, serving to prevent a too free movement of the bolt. 20 is a stationary pin which acts as a back stop for the bolt.

While the invention has been described in some detail, I wish it understood that the drawings are merely illustrative and that changes may be made within the scope of the invention as defined in the appended claims.

I claim:

1. In a lock, a lock frame having a pin cylinder lock thereon, a locking bolt slidably and rotatably mounted on said frame, a rollback secured to the plug of said cylinder lock, a head on the rear end of said locking bolt, said rollback being adapted to engage one side of said head for moving the locking bolt in one direction and engaging the opposite side of said head for moving the locking bolt in the opposite direction, and a friction drag coacting with said bolt to retard its movement in either direction.

2. In a lock, a lock frame, a locking bolt mounted for movement thereon, a spring mounted at one side of said bolt and frictionally engaging one side of the same and acting as a drag to prevent a too free movement thereof in either direction, and key-controlled means for actuating said locking bolt.

3. In a lock, a lock frame including a side plate, an upstanding front flange thereon, said front flange having an aperture for passage of a locking bolt, an apertured lug on said frame to the rear of said upstanding flange, a locking bolt passing through and being guided by said lug and said front flange, a cylinder lock secured to said frame, and a rollback on the plug of said cylinder lock, said rollback serving to engage a part for advancing and retracting said bolt, and resilient means coacting with the side of said bolt and acting as a friction drag thereon.

NORMAN B. HURD.